United States Patent [19]

Weber

[11] Patent Number: 5,181,943
[45] Date of Patent: Jan. 26, 1993

[54] PROCESS AND APPARATUS FOR SEPARATING LIQUID ASH

[75] Inventor: Ekkehard Weber, Essen, Fed. Rep. of Germany

[73] Assignee: Metallgesellschaft Aktiengesellschaft, Frankfurt am Main, Fed. Rep. of Germany

[21] Appl. No.: 489,572

[22] Filed: Mar. 7, 1990

[30] Foreign Application Priority Data

Mar. 8, 1989 [DE] Fed. Rep. of Germany ....... 3907457

[51] Int. Cl.$^5$ .............................................. B01D 50/00
[52] U.S. Cl. .................................... 55/98; 55/345; 55/435; 55/459.1; 55/465; 55/523; 48/DIG. 2
[58] Field of Search .................. 55/97, 98, 435, 485, 55/523, 342, 345, 459.1, 462–465, 257; 110/245, 216, 217; 48/DIG. 2

[56] References Cited

U.S. PATENT DOCUMENTS

| | | | |
|---|---|---|---|
| 162,766 | 5/1875 | Pratt | 55/342 |
| 1,844,369 | 2/1932 | Ross | 55/1 |
| 1,922,013 | 8/1933 | Brady | 55/435 |
| 3,266,227 | 8/1966 | Plizak et al. | 55/485 |
| 3,318,070 | 5/1967 | Zeiss | 55/1 |
| 3,477,208 | 11/1969 | Keller | 55/355 |
| 3,788,244 | 1/1974 | Polsak et al. | 55/235 |
| 4,371,563 | 2/1983 | Muehlberger | 55/90 |
| 4,732,594 | 3/1988 | Mizrah et al. | 55/523 |
| 4,810,273 | 3/1989 | Komoda | 55/523 |
| 4,865,629 | 9/1989 | Zievers et al. | 55/97 |
| 4,902,319 | 2/1990 | Kato et al. | 55/523 |

FOREIGN PATENT DOCUMENTS

| | | | |
|---|---|---|---|
| 1943514 | 3/1971 | Fed. Rep. of Germany | 55/97 |
| 2450002 | 6/1976 | Fed. Rep. of Germany | 55/440 |
| 3720963 | 1/1989 | Fed. Rep. of Germany | 55/97 |
| 68026 | 4/1985 | Japan | 55/332 |

Primary Examiner—Bernard Nozick
Attorney, Agent, or Firm—Felfe & Lynch

[57] ABSTRACT

Disclosed are a process and apparatus for separating liquid ash from an exhaust gas which is formed by the combustion of carbonaceous fuels. The exhaust gas is at a temperature of from 1200° to 1800° C. and under a pressure from 1 to 100 bars and has an ash content, consisting of liquid particles, of 0.1 to 60 g/sm$^3$. In the process, the ash-containing exhaust gas leaving the combustion chamber is directed to a housing in which there is at least one baffle surface oriented substantially transversely to the direction of flow of the exhaust gas which may be preceded by a centrifugal separator and-/or succeeded by a ceramic filter element.

19 Claims, 2 Drawing Sheets

PROCESS AND APPARATUS FOR SEPARATING LIQUID ASH

BACKGROUND OF THE INVENTION

The present invention is in a process and apparatus for separating liquid ash from an exhaust gas which is formed by the combustion of carbonaceous fuels and is at a temperature of from 1200° to 1800° C. at a pressure of from 1 to 100 bars, preferably from 1 to 30 bars, and has an ash content from 0.1 to 60 g/sm$^3$ (sm$^3$ = standard cubic meter).

It is known that small coal particles can be suspended in an oxygen-containing gas and combusted in a combustion chamber so that the inorganic components of the coal become available as ash. In dependence on the the nature of the combustor (consisting, e.g., of a slag tap furnace), the fuel and the oxygen content which is presented, a very high combustion temperature may be achieved so that the exhaust gas formed by the combustion leaves the combustion chamber at a temperature of from 1200° to 1800° C. Under these conditions, the ash which is produced by the combustion may be present in a molten, liquid state.

It is also known that high temperature exhaust gases which are produced by a combustion under pressure can desirably be used to generate electric power because the energy content of these exhaust gases can be converted to electric power by a gas turbine with very high efficiency. The remaining heat content of the combustion exhaust gas leaving the gas turbine can desirably be used to produce steam in a steam boiler. For this reason it is desirable from the aspects of energy and economics to produce combustion exhaust gases which are under pressure and at a temperature which is as high as possible; that temperature lies between 1200° and 1800° C. The production of such a combustion exhaust gas involves the disadvantage that the ash which is formed by the combustion of coal becomes available in a liquid rather than solid state. Before the hot combustion exhaust gas is used in a gas turbine it is necessary to remove substantially all of the liquid ash from the combustion exhaust gas because the gas turbine would otherwise be destroyed by the deposited and solidified ash droplets.

Published German Application 3,720,963 proposes a process wherein ash which is formed by the combustion of coal with air and which is in a pressurized combustion exhaust gas at a temperature from 1200° to 1700° C. is separated from the gas by passing that ash containing gas through at least one porous and gas-permeable ceramic filter element disposed in the combustion chamber. The filter consists mainly of $Al_2O_3$, $SiO_2$, $MgO$ and/or $ZrO_2$.

It has been found that the life of the ceramic filters is limited particularly treating an exhaust gas from the combustion of relatively high ash content coal. For this reason it is an object of the invention to provide a process which is of the kind described first hereinbefore and which uses simple technical means but which results in a separation at a constant rate for the longest period possible.

SUMMARY OF THE INVENTION

The object underlying the invention is accomplished in that the ash-containing exhaust gas leaving the combustion chamber is directed onto at least one baffle surface. It has surprisingly been found that, in dependence on the design of the baffle separator, at least 70% of the liquid ash which is suspended in the exhaust gas can be separated at high temperatures. In the baffle separator known per se, dust particles or droplets will be separated from a gas stream as the gas stream is deflected whereas the particles, due to their inertia, continue in their original direction and impinge on the obstacle and are there deposited (Ullmanns Enzyklopadie der Technischen Chemie, 3rd Edition, Volume II/2, 1968, page 411).

In accordance with the invention the exhaust gas can pass through a centrifugal separator prior to its impingement on a baffle surface. By that measure, a major part of the liquid ash is separated in the centrifugal separator. A combination of a centrifugal separator and a baffle separator achieves a high degree of purification. The centrifugal separator may consist of a cyclone of any of various types.

It is also contemplated in accordance with the invention that the exhaust gas can pass through a ceramic filter element after the direction of flow of the exhaust gas has been changed by at least one baffle surface. The use of a baffle separator and a succeeding filter separator will also result in a high separation rate.

The object underlying the invention is also accomplished by the provision of an apparatus which consists of a housing in which at least one baffle surface is disposed. The housing is formed with a gas inlet and gas outlet and means, such as a drain, for removing the liquid ash. It has been found that a baffle surface should be oriented substantially transversely to the direction of flow of the exhaust gas. Such an arrangement including an angle of about 90° to the direction of flow may be used to separate droplets of liquid ash, which will effectively be drained from the baffle surface and can be discharged from the baffle separator. The exhaust gas may be directed to the baffle surface e.g., in a horizontal or vertical direction.

If the process includes a centrifugal separation stage and a succeeding baffle separation stage, the process can be carried out in accordance with the invention in an apparatus which consists of a cyclone provided with a dip pipe, and of a succeeding housing, in which at least one baffle surface is disposed at an angle of about 90° with the direction of flow of the exhaust gas. The housing includes a drain or outlet for removal of the liquid ash. Due to the high separation rate of the cyclone, the one or more succeeding baffle surface will be contacted by a gas having a lower ash content so that the life of the baffle separator materials will be prolonged.

In accordance with the invention it has also proven satisfactory to provide an apparatus which consists of a cyclone having a dip pipe and at least one baffle surface disposed in the dip pipe which includes an angle of about 90° with the direction of flow of the exhaust gas through the dip pipe. The length of the dip pipe 15 may be changed subject to the efficiency of the cyclone and the pressure loss in the cyclone. The baffle surface may be provided, e.g., in the vertical portion of the dip pipe. In that apparatus simple technical means may be used to separate the liquid ash almost completely from the exhaust gas.

If the process for separating the liquid ash consists of a baffle separator stage and a succeeding filter separator stage, the process can be carried out in accordance with the invention in an apparatus which consists of a housing in which at least one baffle surface is disposed, which includes an angle of about 90° with the direction of flow of the exhaust gas. The housing also includes an opening or other means for removing the liquid ash. The housing is followed by at least one ceramic filter element. The ceramic filter elements are porous and gas-permeable and consist mainly of $Al_2O_3$, $SiO_2$, MgO and/or $ZrO_2$. The filter elements have 10 to 1000 pores/$cm^2$; their open pore porosity is between 30 and 90% and the average pore diameter is between 10 and 2000 um.

It is especially preferred to provide an apparatus which is designed in accordance with the invention and in which the ceramic filter element includes a particulate bed formed from ceramic shaped bodies. The ceramic shaped bodies may be, e.g., spherical and consist mainly of $Al_2O_3$, $SiO_2$, MgO and/or $ZrO_2$. The exhaust gas flows through the particulate bed, e.g., in a vertical direction from top to bottom or from bottom to top. Consequently, the liquid ash particles form relatively coarse drops or liquid layers which are moved substantially by gravity and enter a collecting vessel substantially independently of the gas flow.

In the apparatus designed in accordance with the invention it has proven particularly desirable to coat the baffle surfaces, the inside surfaces of the housing, the dip pipe and the inside surfaces of the cyclone with a refractory ceramic material which is chemically inert to the ash. Such parts have a long life and ensure that a caking of the liquid ash is prevented.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1:
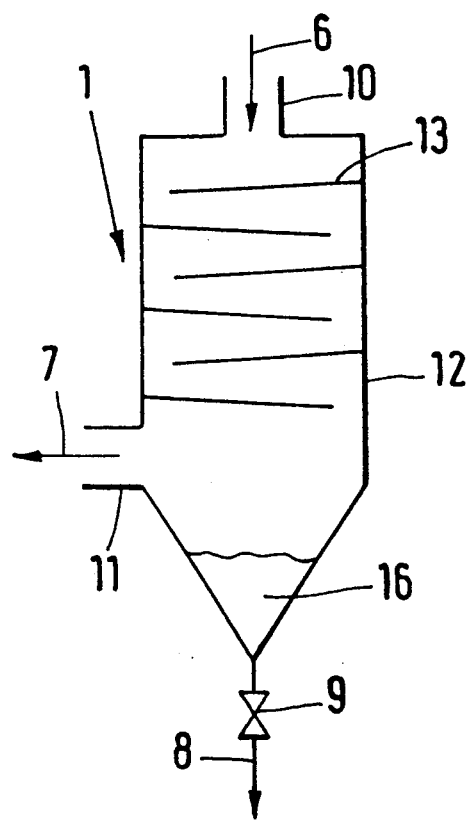
FIG. 1 shows a baffle separator useful in the invention which is supplied with gas flowing vertically from above.

FIG. 1 shows a baffle separator 1, which consists of a housing 12, in which one or more baffle surfaces 13 are disposed and which extend at an angle of approximately, but less than about 90°, preferably 78° to 88°, to the direction of flow of ash-containing exhaust gas 6. The ash-containing exhaust gas 6 is supplied to a baffle separator 1 vertically from top to bottom through inlet 10. As the ash-containing exhaust gas 6 impinges on the baffle surface 13, the droplets of ash are separated and flow down on the slightly inclined baffle surface. The exhaust gas 7, from which most of the droplets of ash have been removed, leaves the baffle separator 1 through outlet 11. The liquid ash 16 is collected in a conical portion of baffle separator 1 and is intermittently withdrawn through valve 9 and line 8.

A combustion exhaust gas which had an ash content of 1.5 g/$sm^3$ and had in a free cross-section a velocity of flow of 5 m/second and was at a temperature of 1500° C. and under a pressure of 3 bars was passed from top to bottom through a baffle separator, which had six baffle surfaces. After a pressure drop of 8000 Pa, the pure gas leaving the separator had an ash of content of about 50 mg/$sm^3$. Similar good results will also be obtained if the exhaust gases flow from bottom to top and particularly if the exhaust gas flows horizontally.

Figure 2:
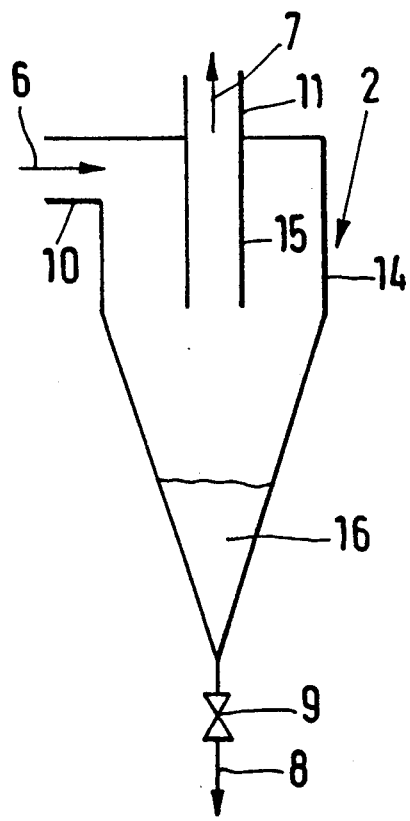
FIG. 2 shows a cyclone provided with a dip pipe.

FIG. 2 shows a cyclone 2 which acts as a centrifugal separator and consists of a housing 14, in which a vertical dip pipe 15, which may be movable, is disposed. The ash-containing exhaust gas 6 tangentially enters the cyclone 2 through inlet 10 and is substantially free of ash when it has contacted the wall surfaces. The exhaust gas 7 from which ash has been removed leaves the cyclone 2 through the outlet 11. The liquid ash 16 is collected in the conical portion of the cyclone 2 and is intermittently removed through the valve 9 and the line 8.

A gas which was at a temperature of 1500° C., under a pressure of about 5 bars and which had a liquid ash content of 30 to 40 g/$sm^3$ and a velocity of flow of about 6 m/sec, passed through a cyclone 2 wherein about 90% of the liquid ash was separated in a single pass therethrough so that the purified exhaust gas 7 had a residual ash content of about 3 g/$sm^3$. The gas was subsequently supplied to a baffle separator 1, in which ash was removed to an ash content of about 20 mg/$sm^3$.

Figure 3:
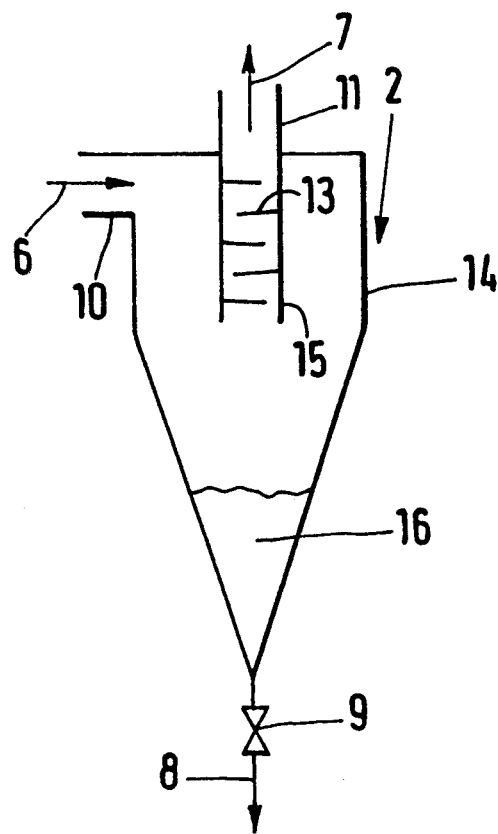
FIG. 3 shows a cyclone provided with a dip pipe in which baffle surfaces are disposed.

FIG. 3 shows a cyclone 2 provided with a dip pipe 15, in which six baffle surfaces 13 are disposed. The remaining parts of cyclone 2 of FIG. 3 correspond with those as described in FIG. 2. A combustion exhaust gas which was at a temperature of 1500° C. and under a pressure of about 5 bars and had a velocity of flow of about 6 m/second and an ash content of 30 to 40 g/$sm^3$ was purified by an apparatus as shown in FIG. 3 to an ash content of about 30 mg/$sm^3$.

Figure 4:
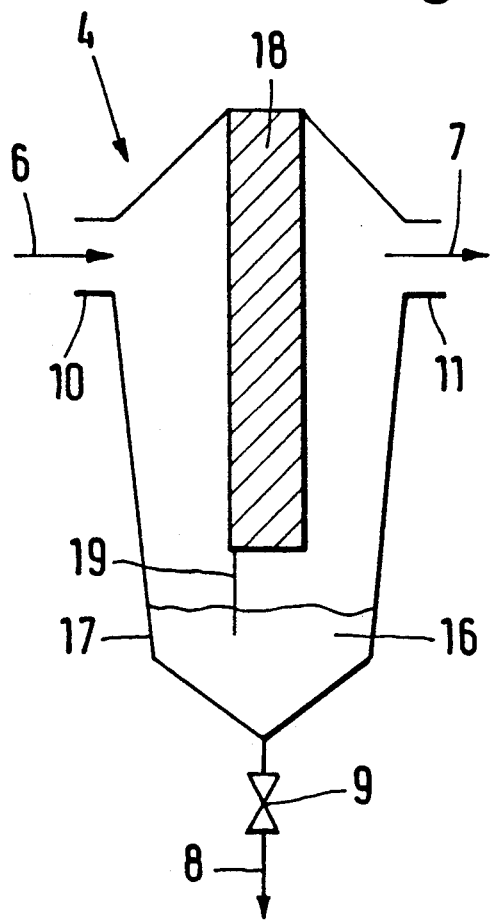
FIG. 4 shows a separator provided with a ceramic filter element.

FIG. 4 shows a filter separator 4, which consists of a housing 17, in which a ceramic filter element 18 is disposed. The filter element 18, consists of porous $ZrO_2$ foam. The ash-containing exhaust gas 6 enters separator 4 horizontally through inlet 10 and impinges on filter element 18 at right angles thereto. A part of the liquid ash which impinges on the filter element is directly separated on the surface of the filter element and is downwardly drained in a vertical direction into the conical portion of the filter separator 4. Another part of the liquid ash penetrates into the filter element 18 and is drained downwardly in a vertical direction into the conical portion of the filter separator 4. A weir 19 is disposed on the raw-gas side of the filter element 18 and always protrudes into the liquid ash 16 in order to separate the raw-gas space from the pure-gas space. As a result, all of the raw gas must pass through filter element 18. The liquid ash 16 is intermittently withdrawn from the filter separator 4 through valve 9 and line 8. The purified exhaust gas 7 leaves the filter separator 4 through outlet 11.

An exhaust gas which had an ash content of 7 g/$sm^3$ and was at a temperature of 1500° C. and under a pressure of 3 bars and had a velocity of about 5 m/second, was purified to an ash content of 100 mg/$sm^3$ by a single pass through a filter element 18. The pressure drop was about 500 Pa.

Figure 5:
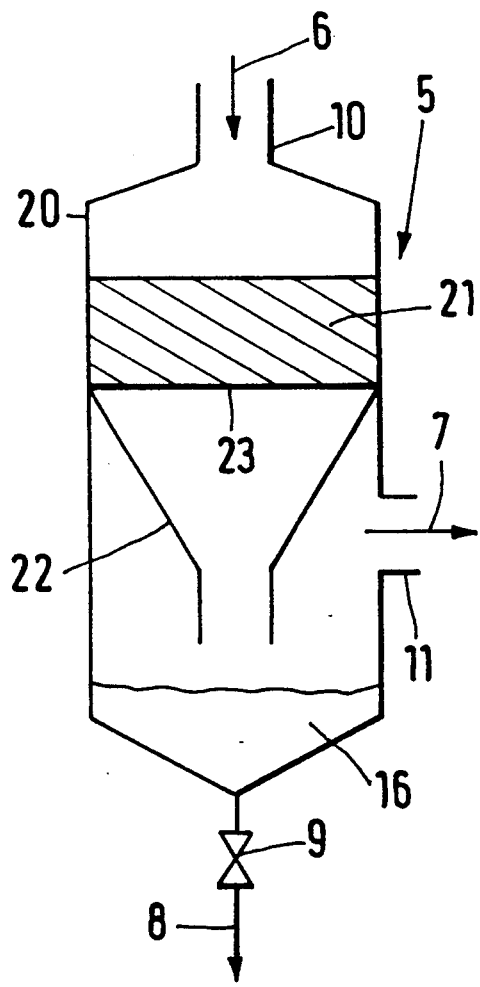
FIG. 5 shows a separator which is provided with a particulate bed of ceramic material and is supplied with gas from above.

FIG. 5 shows a separator 5 which contains a particulate bed. The gas flows vertically from top to bottom through the bed. The separator 5 consists of a housing 20, in which a filter element consisting of a particulate layer 21 of ceramic material, is disposed. The particulate layer 21 is of spherical particles of $ZrO_2$ and is provided on a perforated plate 23. The ash-containing gas 6 flows through inlet 10 into separator 5, which contains a particulate bed and in which the gas flows vertically through the particulate layer 21 from top to bottom. The purified exhaust gas 7 leaves separator 5 through outlet 11. The particulate layer 21 is permeable to gas and to liquid ash. The liquid ash is collected in funnel 22, drained into the conical portion of separator 5, and is intermittently removed from the particulate bed separator 5 through valve 9 and line 8.

A combustion exhaust gas which was at a temperature of about 1500° C., under a pressure of about 6 bars and had a velocity of flow of about 4 m/second and an ash content of about 4 g/sm$^3$ was purified to a residual ash content of less than 5 mg/sm$^3$ in a single pass through the particulate bed separator 5.

Figure 6:
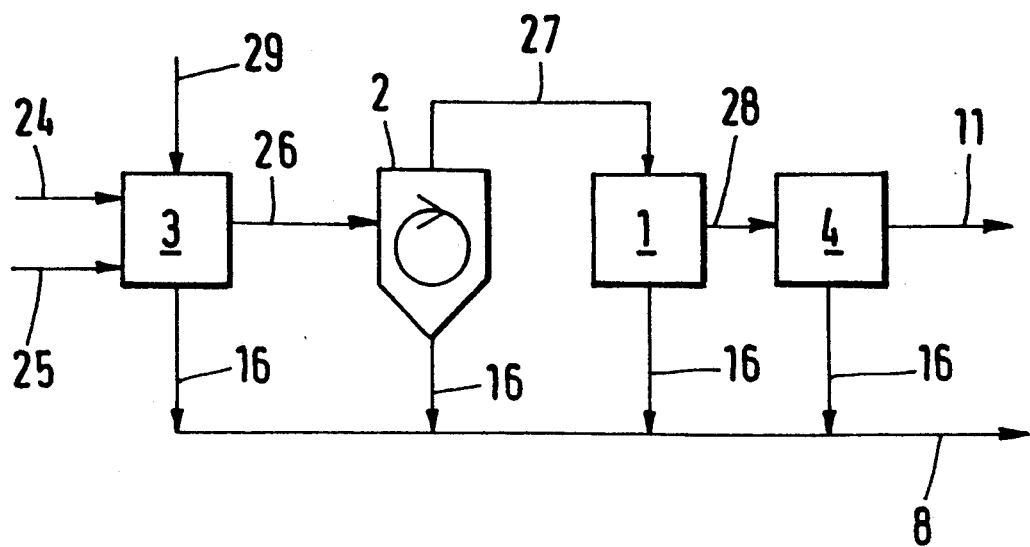
FIG. 6 illustrates a process of the invention for separating liquid ash.

FIG. 6 is a flow scheme of the process in accordance with the invention, which can be carried out as shown whenever entrained particles of liquid ash must be removed at a relatively high rate from hot combustion exhaust gases.

A coal powder, which may be suspended in air, and air, which may be enriched with oxygen, are supplied through lines 24 and 25, respectively, to a combustion chamber 3 wherein the coal is combusted at a temperature of about 1600° C. and under a pressure of from 15 to 20 bars. The combustion may be effected at under- or overstoichiometric conditions. Liquid ash is produced by the combustion and is removed, in part, in the combustion chamber 3. The remaining liquid ash, which may amount to 30 to 40 g/sm$^3$, is suspended in the flue gas (combustion exhaust gas) and is supplied through line 26 to cyclone 2 where up to 90% or more of the liquid ash is separated. The exhaust gas leaving the cyclone 2 through line 27 has a low ash content of less than 5 g/sm$^3$, and preferably 2 to 3 g/sm$^3$. That exhaust gas enters the baffle separator 1, where 90% of the liquid ash is separated so that the exhaust gas which leaves the baffle separator 1 through line 28 contains less than 500 mg/sm$^3$, preferably 20 mg/sm$^3$. The exhaust gas out of separator 1 enters the filter separator 4, in which a pure gas with an ash content below 5 mg/sm$^3$ is produced. The pure gas leaves the filter separator through line 11. The liquid ash 16 which is collected in all units is discharged through line 8.

The use of at least one cyclone 2 will be required whenever a gas with a high ash content must be purified. A cyclone is not required if the exhaust gas has an ash content below about 1 g/sm$^3$. The use of a filter separator 4 or 5 will depend on the design and performance of the preceding separators and is acceptable if the pure gas is required to have an extremely low ash content of about 1 mg/sm$^3$. The exclusive use of a baffle separator 1 is acceptable if the exhaust gas has an ash content below 5 g/sm$^3$ and if the ash is suspended in the exhaust gas in the form of relatively large droplets.

To start up the units used in the process, ash-free fuel oil, rather than coal, is supplied to the combustion chamber 3 through line 29. The supply of fuel oil is discontinued when the units have heated up to the exhaust gas temperature. If the filter separator 4 is used, the weir 19 is closed during the start-up operation, i.e., the weir 19 will then be lowered as far as to the bottom of the filter separator 4. To operate the processing units, coal powder is replaced by fuel oil, which is supplied to the combustion chamber 3 through line 29. The combustion of the fuel oil is continued until liquid ash has been removed from all processing units.

The process illustrated in FIG. 6 has been carried out in a troublefree operation for several hundred hours. A gas which had a residual ash content below 5 mg/sm$^3$ was continuously removed through line 11.

Substances such as chamotte, dead burned fire day, steatite or carburetted stone can be used when it is desirable to coat the baffle surfaces, the inside surfaces of the housing, the dip pipe and the inside surfaces of the cyclone with refractory inert to the ash.

It will be understood that the specification and examples are illustrative but not limitative of the present invention and that other embodiments within the spirit and scope of the invention will suggest themselves to those skilled in the art.

I claim:

1. A process for separating liquid ash from an exhaust gas which is formed by combustion of a carbonaceous fuel comprising:

introducing the liquid ash containing exhaust gas stress at a temperature of from 1200° to 1800° C. into a housing means;

directing the liquid ash containing exhaust gas in the housing means onto at least one baffle surface whereby liquid ash is removed from the exhaust gas, said baffle surface being oriented substantially transversely to the direction of flow of the liquid ash containing gas; and exhausting the gas from the housing means.

2. The process of claim 1 wherein the exhaust gas is subjected to a centrifugal separation prior to impinging on the at least one baffle surface.

3. The process of claim 1 wherein the exhaust gas is passed through a ceramic filter element after impinging on the least one baffle surface.

4. The process of claim 1 wherein the exhaust gas is under a pressure from 1 to 100 bars.

5. The process of claim 4 wherein the exhaust gas has an ash content from 0.1 to 60 g/sm$^3$.

6. The process of claim 4 wherein the exhaust gas is under a pressure of from 1 to 30 bars.

7. The process of claim 6 wherein the exhaust gas has an ash content from 0.1 to 60 g/sm$^3$.

8. An apparatus for separately liquid ash from an exhaust gas which is formed by combustion of a carbonaceous fuel comprising: a cyclone having inlet means for introducing the exhaust gas into said cyclone and outlet means through which gas leaves said cyclone, said outlet means comprising a dip pipe housed in said cyclone; at least one baffle surface in said dip pipe, said baffle surface being disposed at an angle of about 90° with respect to the direction of flow of the exhaust gas; and means for removing the liquid ash from the cyclone.

9. The apparatus of claim 8 wherein the least one baffle surface, the dip pipe and the inside surfaces of the cyclone are coated with a refractory ceramic material which is chemically inert to the ash.

10. The apparatus of claim 8 further comprising at least one ceramic filter element in a housing, said housing being in fluid communication with said second cyclone outlet means.

11. The apparatus of claim 10 wherein the housing is equipped with weir means.

12. The apparatus of claim 10 wherein the ceramic filter element consists of a particulate bed of ceramic solids.

13. The apparatus of claim 12 wherein the ceramic solids are at least one of $Al_2O_3$, $SiO_2$, MgO and ZrO.

14. A system for separating liquid ash from an exhaust gas formed by combustion of carbonaceous fuel comprising:
   separation means into which the exhaust gas is introduced to produce a first treated gas;
   cyclone means having an inlet through which the first treated gas enters and outlet means comprising a dip pipe housed within said cyclone means, said dip pipe having baffle means with a surface onto which the first treated gas is directed, said baffle means being disposed substantially transversely to the direction of flow of the first treated gas.

15. A system of claim 14 wherein the housing is provided with weir means.

16. The system of claim 14 wherein the least one baffle surface, the dip pipe and the inside surfaces of the cyclone means are coated with a refractory ceramic material which is chemically inert to the ash.

17. The system of claim 14 further comprising a ceramic filter element in a housing through which the gas leaving the cyclone means flows.

18. The system of claim 17 wherein the ceramic element consists of a bed of solid ceramic particles.

19. The system of claim 17 wherein the ceramic solids are at least one of $Al_2O_3$, $SiO_2$, MgO and ZrO.

* * * * *

UNITED STATES PATENT AND TRADEMARK OFFICE
CERTIFICATE OF CORRECTION

PATENT NO. : 5,181,943
DATED : January 26, 1993
INVENTOR(S) : Ekkehard Weber It is certified that error appears in the above-identified patent and that said Letters Patent is hereby corrected as shown below:

Col. 5, line 46, "500" should read --50--.

Col. 6, line 26, claim 1, "stress" should read --stream--.

Col. 6, line 50, claim 8, "separately" should read --separating--.

Col. 7, line 13, claim 14, after "means" insert --to exhaust gas from the cyclone means; said outlet means--.

Signed and Sealed this

Tenth Day of May, 1994

Attest:

BRUCE LEHMAN

Attesting Officer          Commissioner of Patents and Trademarks